(12) United States Patent
Song

(10) Patent No.: US 11,818,991 B2
(45) Date of Patent: *Nov. 21, 2023

(54) LIGHT SOURCE MODULE FOR PLANT CULTIVATION

(71) Applicant: SEOUL VIOSYS CO., LTD., Gyeonggi-do (KR)

(72) Inventor: Hyun Su Song, Gyeonggi-do (KR)

(73) Assignee: Seoul Viosys Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,754

(22) Filed: Feb. 18, 2022

(65) Prior Publication Data

US 2022/0167562 A1 Jun. 2, 2022

Related U.S. Application Data

(63) Continuation of application No. 17/237,614, filed on Apr. 22, 2021, now Pat. No. 11,252,874.

(60) Provisional application No. 63/015,195, filed on Apr. 24, 2020.

(51) Int. Cl.
*A01G 7/04* (2006.01)
*H05B 47/10* (2020.01)
*F21V 23/00* (2015.01)
*H05B 47/105* (2020.01)

(52) U.S. Cl.
CPC ............ *A01G 7/045* (2013.01); *F21V 23/003* (2013.01); *H05B 47/105* (2020.01)

(58) Field of Classification Search
None
See application file for complete search history.

(56) References Cited

U.S. PATENT DOCUMENTS

| | | | |
|---|---|---|---|
| 8,458,954 B2 | 6/2013 | Yamada et al. | |
| 11,252,874 B2 | 2/2022 | Song | |
| 2011/0147617 A1 | 6/2011 | Shur et al. | |
| 2014/0225003 A1 | 8/2014 | Koo et al. | |
| 2019/0142038 A1* | 5/2019 | Nicole | A01G 7/045 426/250 |

(Continued)

FOREIGN PATENT DOCUMENTS

| | | |
|---|---|---|
| CN | 110249833 | 9/2019 |
| JP | 2011097900 A * | 5/2011 |

(Continued)

OTHER PUBLICATIONS

English translation of International Search Report for International Application No. PCT/KR2021/005185, dated Aug. 9, 2021, 3 pages.

(Continued)

*Primary Examiner* — Dedei K Hammond
(74) *Attorney, Agent, or Firm* — LaBatt, LLC

(57) ABSTRACT

A light source module for plant cultivation includes a main light source, an auxiliary light source unit, and a controller. The main light source unit emits background light which is visible light for growth of a plant. The auxiliary light source unit emits auxiliary light including UVB, UVC, or both to increase the content of phytochemicals in the plant. The controller controls operation of the main light source unit and the auxiliary light source unit based on a control signal.

19 Claims, 11 Drawing Sheets

(56) References Cited

U.S. PATENT DOCUMENTS

2019/0223390 A1     7/2019   Oh et al.
2021/0329849 A1*   10/2021   Song .................... H05B 47/105

FOREIGN PATENT DOCUMENTS

| JP | 2013153691 A | 8/2013 | | |
|----|----|----|----|----|
| KR | 1020110134541 A | 12/2011 | | |
| KR | 1020140102481 A | 8/2014 | | |
| KR | 1020140123212 A | 10/2014 | | |
| KR | 1020160125131 A | 10/2016 | | |
| KR | 101813239 B1 | 12/2017 | | |
| WO | WO-2020121701 A1 * | 6/2020 | ............. | A01G 7/045 |

OTHER PUBLICATIONS

Notice of allowance, U.S. Appl. No. 17/237,614, dated Jan. 7, 2022, 9 pages.

* cited by examiner

LIGHT SOURCE MODULE FOR PLANT CULTIVATION

CROSS-REFERENCE TO RELATED APPLICATION

This Application is a continuation of U.S. application Ser. No. 17/237,614 filed Apr. 22, 2021 which claims priority from and the benefit of U.S. Provisional Patent Application No. 63/015,195, filed on Apr. 24, 2020, the disclosure of which are hereby incorporated by reference for all purposes as if fully set forth herein.

BACKGROUND

Field

Embodiments of the present disclosure relate to a light source module for plant cultivation.

Discussion of the Background

Plants contain phytochemicals that have beneficial effects on a subject in need thereof. Phytochemical levels of plants vary depending on growth environments. For example, plants produce antioxidants to protect themselves against damage from oxidative stress. When a human consumes a plant that contains a large amount of phytochemicals as food, the phytochemicals contained in the consumed plant produce similar effects on the human body. Thus, in order to obtain phytochemicals efficiently, it is desirable to harvest plants when plants contains phytochemicals at their optimal levels.

One conventional way to improve the phytochemical content of a plant is to subject a plant to stress.

There are many different kinds of plants and there are also many different kinds of phytochemicals in different plants. In addition, different phytochemicals and different ingredients contained therein have different efficacies.

Ginseng, lance asiabell, Chinese leek, ginger, lemon balm, mint, and sprout ginseng are shade plants that can live in the shade due to low light saturation and light compensation points thereof.

In particular, ginseng and sprout ginseng are known to be rich in ginsenoside.

Representative examples of ginsenoside ingredients include Rg1, Rb1, Re, Rf, Rg2, R1, Rc, Rb2, Rb3, and Rd, which have different efficacies.

However, a conventional method of subjecting a plant to stress as described above has failed to effectively increase the content of a specific phytochemical, despite being capable of increasing the total phytochemical content.

SUMMARY

Embodiments of the present disclosure provide a light source module for plant cultivation which can increase the phytochemical content of a plant, and a plant cultivation method using the same.

Embodiments of the present disclosure provide a light source module for plant cultivation which can effectively increase the content of a specific phytochemical in a plant, and a plant cultivation method using the same.

In accordance with one aspect of the present disclosure, a light source module for plant cultivation includes a main light source unit, an auxiliary light source unit, and a controller. The main light source unit emits background light which is visible light for growth of a plant. The auxiliary light source unit emits auxiliary light including at least one selected from among UVB and UVC to increase the content of phytochemicals in the plant. The controller controls operation of the main light source unit and the auxiliary light source unit based on a control signal. Here, the control signal contains information about conditions of the auxiliary light for increase in content of a target phytochemical among the phytochemicals. The conditions of the auxiliary light may include the type and cumulative dose of the auxiliary light.

In at least one variant, the auxiliary light source unit may include a first auxiliary light source unit and a second auxiliary light source unit. The first auxiliary light source unit may include at least one first auxiliary light source emitting UVB as a first type of auxiliary light. In addition, the second auxiliary light source unit may include at least one second auxiliary light source emitting UVC as a second type of auxiliary light.

In another variant, the controller may control the first auxiliary light source unit to emit the first type of auxiliary light or control the second auxiliary light source unit to emit the second type of auxiliary light based on the control signal.

In further another variant, the first auxiliary light source unit may include multiple first auxiliary light sources providing the same irradiance. In addition, the second auxiliary light source unit may include multiple second auxiliary light sources providing the same irradiance.

Here, the controller may control the number of first auxiliary light sources put into operation such that the plant is supplied with the first type of auxiliary light at a cumulative dose corresponding to the control signal. Alternatively, the controller may control the number of second auxiliary light sources put into operation such that the plant is supplied with the second type of auxiliary light at a cumulative dose corresponding to the control signal.

In another variant, the first auxiliary light source unit may include multiple first auxiliary light sources emitting the first type of auxiliary light at different irradiances. In addition, the second auxiliary light source unit may include multiple second auxiliary light sources emitting the second type of auxiliary light at different irradiances.

Here, the controller may control the auxiliary light source unit such that a first auxiliary light source emitting the first type of auxiliary light at an irradiance suitable for delivering a cumulative dose corresponding to the control signal is operated. Alternatively, the controller may control the auxiliary light source unit such that a second auxiliary light source emitting the second type of auxiliary light at an irradiance suitable for delivering a cumulative dose corresponding to the control signal is operated.

In another variant, the main light source unit may supply the background light to the plant during a light period throughout a cultivation period.

In addition, the auxiliary light source unit may supply the auxiliary light to the plant during the light period one day before harvesting the plant.

The phytochemicals may be ginsenoside.

The target phytochemical may be ginsenoside or at least one selected from ginsenoside ingredients including Rg1, Re, Rc, Rb2, Rd, Rb1, and Rb3.

When the target phytochemical is Rg1, the controller may control the auxiliary light source unit to supply the plant with the first type of auxiliary light at a cumulative dose ranging from 5.76 kJ/m$^2$ to less than 11.5 kJ/m$^2$.

When the target phytochemical is Re, the controller may control the auxiliary light source unit to supply the plant with the first type of auxiliary light at a cumulative dose ranging from 4.32 kJ/m² to less than 11.5 kJ/m² or the second type of auxiliary light at a cumulative dose of greater than 5.76 kJ/m² to 11.5 kJ/m².

When the target phytochemical is Rc, the controller may control the auxiliary light source unit to supply the plant with the first type of auxiliary light at a cumulative dose in the range of greater than 1.08 kJ/m² to less than 4.32 kJ/m² or greater than 4.32 kJ/m² to less than 11.5 kJ/m² or the second type of auxiliary light at a cumulative dose in the range of greater than 5.76 kJ/m² to 11.5 kJ/m².

When the target phytochemical is Rb2, the controller may control the auxiliary light source unit to supply the plant with the second type of auxiliary light at a cumulative dose in the range of greater than 5.76 kJ/m² to 11.5 kJ/m².

When the target phytochemical is Rd, the controller may control the auxiliary light source unit to supply the plant with the first type of auxiliary light at a cumulative dose of greater than 1.08 kJ/m² to less than 4.32 kJ/m² or greater than 4.32 kJ/m² to less than 11.5 kJ/m² or the second type of auxiliary light at a cumulative dose of greater than 5.76 kJ/m² to 11.5 kJ/m².

When the target phytochemical is Rb1, the controller may control the auxiliary light source unit to supply the plant with the first type of auxiliary light at a cumulative dose ranging from 4.32 kJ/m² to less than 11.5 kJ/m² or the second type of auxiliary light at a cumulative dose of greater than 3.24 kJ/m² to less than 5.76 kJ/m².

When the target phytochemical is Rb3, the controller may control the auxiliary light source unit to supply the plant with the second type of auxiliary light at a cumulative dose of greater than 5.76 kJ/m² to 11.5 kJ/m².

When the target phytochemical is ginsenoside, the controller may control the auxiliary light source unit to supply the plant with the first type of auxiliary light at a cumulative dose of greater than 0.54 kJ/m² to less than 11.5 kJ/m² or the second type of auxiliary light at a cumulative dose of 11.5 kJ/m².

The plant may be a shade plant.

The shade plant may be sprout ginseng.

According to embodiments of the present disclosure, the light source module for plant cultivation and the plant cultivation method using the same can increase the total content of ginsenoside, which is a phytochemical compound contained in a shade plant, through treatment with auxiliary light.

In addition, according to embodiments of the present disclosure, the light source module for plant cultivation and the plant cultivation method using the same can effectively increase the content of a target phytochemical in a plant by supplying the plant with auxiliary light suitable for increasing the content of the target phytochemical.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
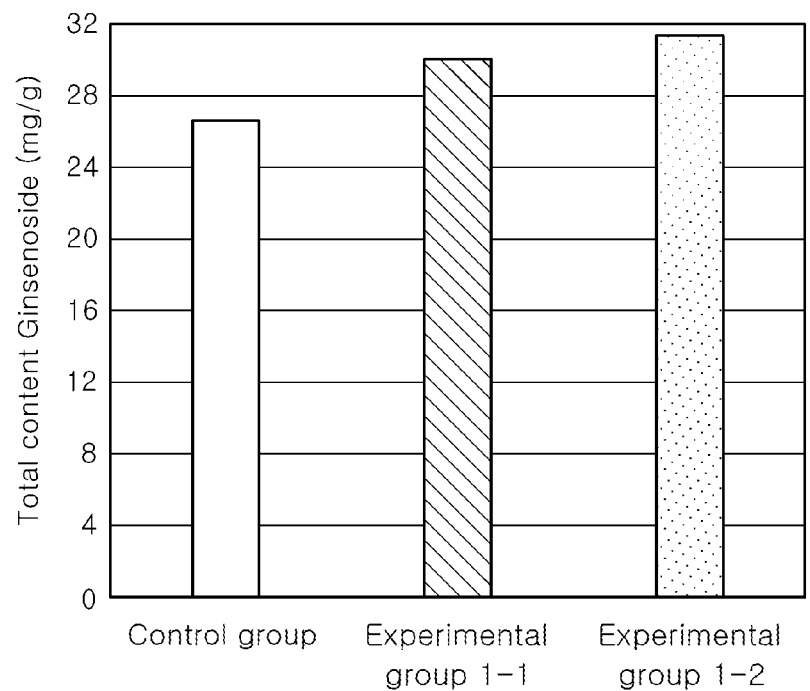
FIG. 1 is a graph showing total ginsenoside content in sprout ginseng according to Experiment 1 of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the scope of the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to other element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules, such as control boards and control units. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In the present disclosure, experiments were conducted to determine change in content of phytochemicals of a shade plant depending on light treatment conditions.

The shade plant used in these experiments was sprout ginseng.

In addition, the phytochemicals in the shade plant in the experiments were ginsenoside ingredients.

Sprout ginseng samples used in the experiments were obtained by transplanting ginseng seedlings into a cultivation bed in a plant cultivation chamber and cultivating the ginseng seedlings for 6 weeks while supplying purified water to the ginseng seedlings, followed by harvesting.

Here, the plant cultivation chamber provided the shade plant with an environment in which 16 hours of light period providing background light alternated with 8 hours of dark period at 22° C. and 60% RH.

Here, the background light was visible light in which red light, blue light, and white light were mixed.

In addition, the background light had an irradiance (photosynthetic photon flux density (PPFD)) of 153 µmol/m²/s.

Besides the background light, different conditions of auxiliary light were used in light treatment during cultivation of the sprout ginseng samples.

Here, the auxiliary light was UV light.

The auxiliary light was supplied to the sprout ginseng samples during the light period one day before harvesting.

A control group was a sprout ginseng group cultivated only under illumination with the background light without exposure to the auxiliary light.

Experimental groups were sprout ginseng groups supplied with both the background light and the auxiliary light.

In these experiments, the phytochemical content of the Control group and the Experimental groups harvested after cultivation was measured.

Measurement of the phytochemical content was carried out through the following procedure: First, an aerial part of each of the harvested sprout ginseng samples was frozen with liquid nitrogen, followed by further adding liquid nitrogen to the frozen aerial part, which, in turn, was pulverized with a pestle.

Then, 0.5 g of the pulverized aerial part was introduced into a 15 ml conical tube along with an extraction solvent (5 ml, 100% MeOH) to prepare a specimen.

The specimen was subjected to sonication for 1 hour.

After sonication of the specimen, only a supernatant was separated by centrifugation (2,000 rpm/2 min). The separated supernatant was filtered through a 0.45 µm syringe filter, followed by analyzing phytochemicals in sprout ginseng by HPLC.

Experiment 1

Experiment 1 was aimed at determining whether treatment with auxiliary light would cause change in ginsenoside content of sprout ginseng.

In Experiment 1, sprout ginseng groups treated with different conditions of auxiliary light were used as Experimental group 1-1 and Experimental group 1-2.

Experimental group 1-1 included sprout ginseng samples treated with UVB as auxiliary light 1-1. Here, the sprout ginseng samples of Experimental group 1-1 were exposed to a cumulative dose of auxiliary light 1-1 of 1.08 kJ/m².

Experimental group 1-2 included sprout ginseng samples treated with UVB as auxiliary light 1-2. Here, the sprout ginseng samples were exposed to a cumulative dose of auxiliary light 1-2 of 2.16 kJ/m².

As such, despite being the same type of UV light, auxiliary light 1-1 and auxiliary light 1-2 provided different cumulative doses to sprout ginseng.

FIG. 1 is a graph showing the total ginsenoside content of sprout ginseng according to Experiment 1 of the present disclosure.

Referring to FIG. 1, the total ginsenoside content was higher in both Experimental group 1-1 and Experimental group 1-2 than in Control group.

Specifically, the total ginsenoside content was about 13.27% higher in Experimental group 1-1 than in Control group. In addition, the total ginsenoside content was about 18.32% higher in Experimental group 1-2 than in Control group.

Therefore, it can be seen that exposure to UVB as the auxiliary light can increase the total ginsenoside content of sprout ginseng.

Figure 2:
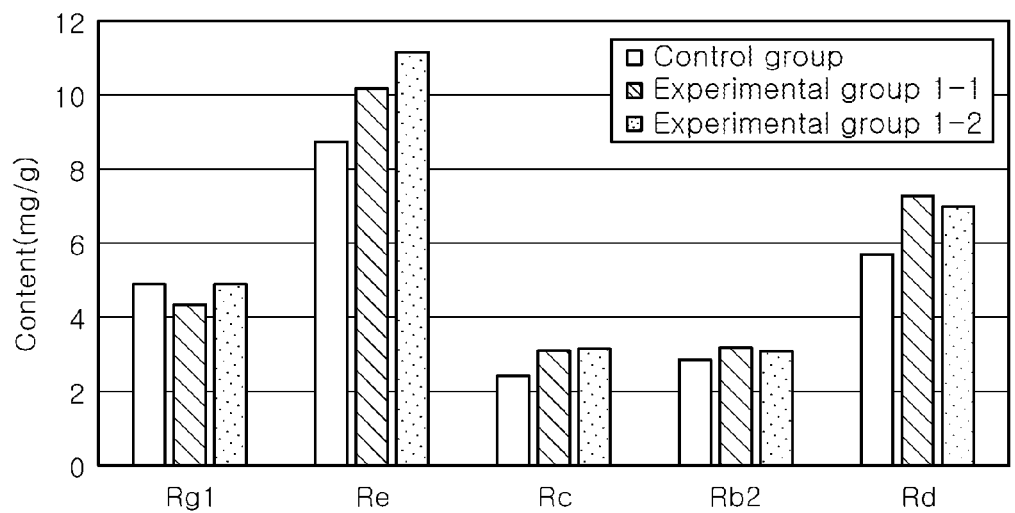
FIG. 2 is a graph showing contents of ginsenoside ingredients Rg1, Re, Rc, Rb2, and Rd in sprout ginseng according to Experiment 1 of the present disclosure.
Figure 3:
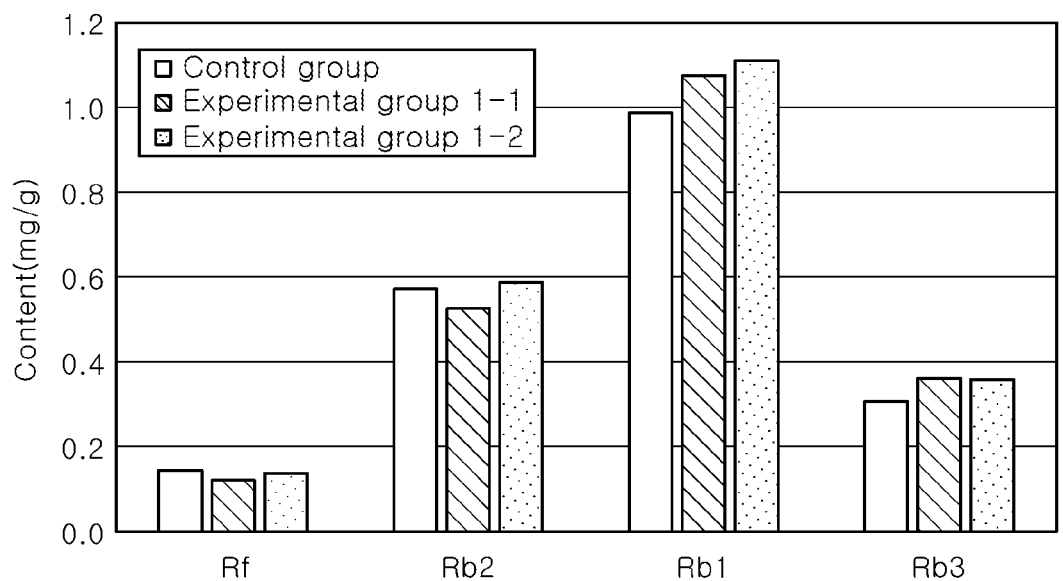
FIG. 3 is a graph showing contents of ginsenoside ingredients Rf, Rg2, Rb1, and Rb3 in sprout ginseng according to Experiment 1 of the present disclosure.

FIG. 2 and FIG. 3 are graphs showing the content of specific ginsenoside ingredients in sprout ginseng according to Experiment 1 of the present disclosure.

FIG. 2 is a graph showing the contents of ginsenoside ingredients Rg1, Re, Rc, Rb2, and Rd in sprout ginseng according to Experiment 1 of the present disclosure.

FIG. 3 is a graph showing the contents of ginsenoside ingredients Rf, Rg2, Rb1, and Rb3 in sprout ginseng according to Experiment 1 of the present disclosure.

Referring to FIG. 2 and FIG. 3, the contents of Re, Rc, Rb2, Rd, Rb1 and Rb3 were higher in Experimental group 1-1 and Experimental group 1-2 than in Control group.

In particular, the content of Re was about 16.38% higher in Experimental group 1-1 and about 27.84% higher in Experimental group 1-2 than in Control group.

The content of Rc was about 27.95% higher in Experimental group 1-1 and about 30.09% higher in Experimental group 1-2 than in Control group.

The content of Rd was about 27.63% higher in Experimental group 1-1 and about 22.87% higher in Experimental group 1-2 than in Control group.

The contents of Rg1, Rf, and Rg2 were lower or insignificantly higher in experimental group 1-1 and experimental group 1-2 than in the Control group.

These results show that treatment with UVB as the auxiliary light can increase the total ginsenoside content of sprout ginseng despite not being capable of increasing the content of all the ginsenoside ingredients.

That is, the results shown in FIG. 2 and FIG. 3 show that treatment of sprout ginseng with UVB as the auxiliary light can increase the content of some ginsenoside ingredients capable of responding to UVB.

Experiment 2

Experiment 2 was aimed at determining where there would be a difference in ginsenoside content between sprout ginseng groups treated with UVB as the auxiliary light at different cumulative doses.

Experimental group 2-1 included sprout ginseng samples treated with UVB as auxiliary light 2-1. Here, the sprout ginseng samples were exposed to a cumulative dose of auxiliary light 2-1 of 0.54 kJ/m².

Experimental group 2-2 included sprout ginseng samples treated with UVB as auxiliary light 2-2. Here, the sprout ginseng samples were exposed to a cumulative dose of auxiliary light 2-2 of 2.16 kJ/m².

Experimental group 2-3 included sprout ginseng samples treated with UVB as auxiliary light 2-2. Here, the sprout ginseng samples were exposed to a cumulative dose of auxiliary light 2-3 of 4.32 kJ/m².

Experimental group 2-4 included sprout ginseng samples treated with UVB as auxiliary light 2-2. Here, the sprout ginseng samples were exposed to a cumulative dose of auxiliary light 2-4 of 5.76 kJ/m².

Figure 4:
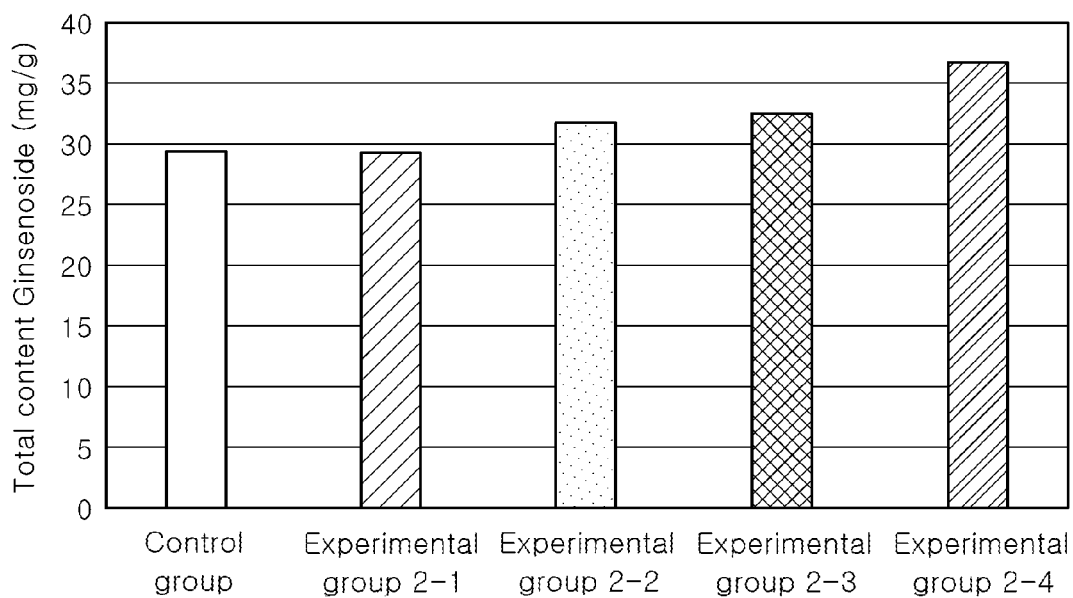
FIG. 4 is a graph showing total ginsenoside content in sprout ginseng according to Experiment 2 of the present disclosure.

FIG. 4 is a graph showing the total ginsenoside content of sprout ginseng according to Experiment 2 of the present disclosure.

Referring to FIG. 4, the total ginsenoside content was higher in Experimental groups 2-2, 2-3, 2-4 than in Control group.

Specifically, the total ginsenoside content was about 8.08% higher in Experimental group 2-2, about 10.66% higher in Experimental group 2-3, and about 24.96% higher in Experimental group 2-4 than in Control group.

There was no significant difference in the total ginsenoside content between Experimental group 2-1 and Control group.

These results show that the total ginsenoside content of sprout ginseng increases as the cumulative dose of the auxiliary light supplied to sprout ginseng increases in the range of 0.54 kJ/m² to 11.50 kJ/m².

Figure 5:
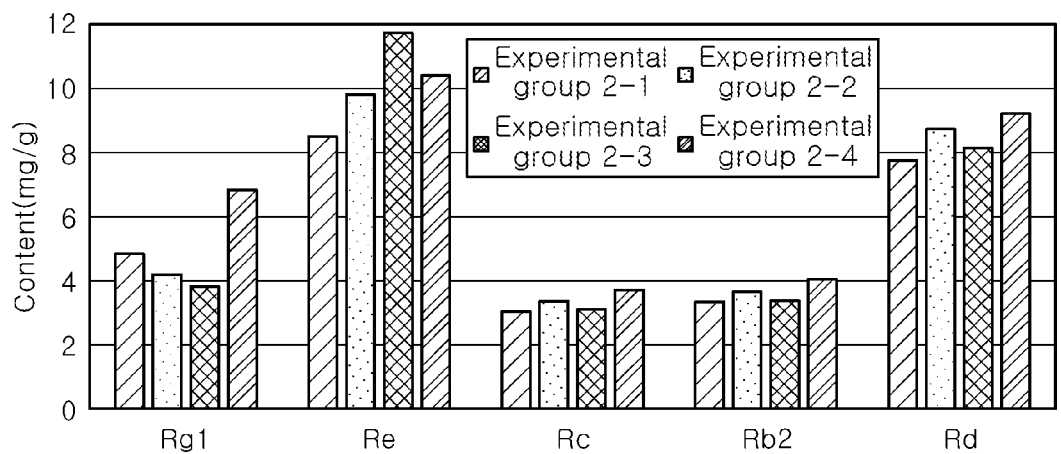
FIG. 5 is a graph showing contents of ginsenoside ingredients Rg1, Re, Rc, Rb2, and Rd in sprout ginseng according to Experiment 2 of the present disclosure.
Figure 6:
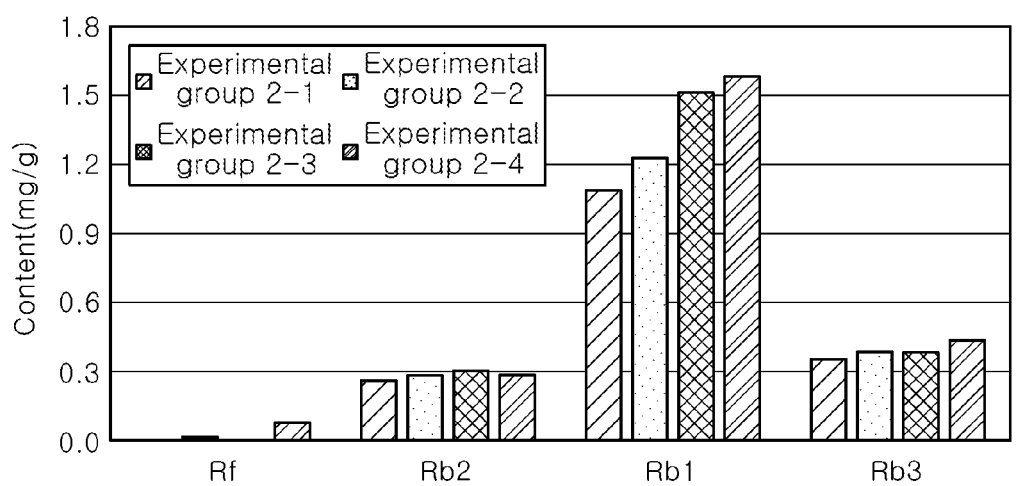
FIG. 6 is a graph showing contents of ginsenoside ingredients Rf, Rg2, Rb1, and Rb3 in sprout ginseng according to Experiment 2 of the present disclosure.

FIGS. 5 and 6 are graphs showing the content of specific ginsenoside ingredients in sprout ginseng according to Experiment 2 of the present disclosure.

FIG. 5 is a graph showing the contents of ginsenoside ingredients Rg1, Re, Rc, Rb2, and Rd in sprout ginseng according to Experiment 2 of the present disclosure.

FIG. 6 is a graph showing the contents of ginsenoside ingredients Rf, Rg2, Rb1, and Rb3 in sprout ginseng according to Experiment 2 of the present disclosure.

Referring to FIG. 5, the content of Rg1 was lower in Experimental group 2-2 and Experimental group 2-3 than in Experimental group 2-1. That is, the content of Rg1 decreased with increasing cumulative dose of the auxiliary light supplied to sprout ginseng in the range of 0.54 kJ/m² to 11.50 kJ/m².

However, the content of Rg1 was about 41.56% higher in Experimental group 2-4 than in Experimental group 2-1.

Particularly, the content of Rg1 was about 63.05% higher in Experimental group 2-4 than in Experimental group 2-2, which was exposed to the auxiliary light at a cumulative dose of 2.16 J/m².

The content of Re was higher in Experimental group 2-2 and Experimental group 2-3 than in Experimental group 2-1.

The content of Re was about 15.36% higher in Experimental group 2-2, about 38.12% in Experimental group 2-3, and about 22.27% in Experimental group 2-4 than in Experimental group 2-1.

However, the content of Re was about 11.48% lower in Experimental group 2-4 than in Experimental group 2-3, which was exposed to the auxiliary light at a lower cumulative dose than Experimental group 2-4.

The contents of Rc, Rb and Rd were higher in Experimental groups 2-2 to 2-4 than in Experimental group 2-1.

Specifically, the content of Rc was about 10.14% higher in Experimental group 2-2 and about 22.03% higher in Experimental group 2-4 than in Experimental group 2-1.

In addition, the content of Rb was about 8.85% higher in Experimental group 2-2 and about 20.58% higher in Experimental group 2-4 than in Experimental group 2-1.

The content of Rd was about 12.76% higher in Experimental group 2-2 and about 18.97% higher in Experimental group 2-4 than in Experimental group 2-1.

Referring to FIG. 6, little or no Rf was detected in Experimental group 2-1 and Experimental group 2-3.

In addition, only a trace amount of Rf was detected in Experimental group 2-2 and Experimental group 2-4.

These results show that exposure to UVB as the auxiliary light cannot increase the content of Rf in sprout ginseng.

The content of Rg2 was higher in Experimental groups 2-2 to 2-4 than in Experimental group 2-1.

Specifically, the content of Rg2 was about 8.85% higher in Experimental group 2-2, about 15.32% higher in Experimental group 2-3, and about 9.49% higher in Experimental group 2-4 than in Experimental group 2-1.

The content of Rb1 was highest in Experimental group 2-4, followed by Experimental group 2-3, Experimental group 2-2, and Experimental group 2-1.

Specifically, the content of Rb1 was about 12.16% higher in Experimental group 2-2, about 38.07% higher in Experimental group 2-3, and about 44.55% higher in Experimental group 2-4 than in Experimental group 2-1.

The content of Rb3 was higher in Experimental groups 2-2 to 2-4 than in Experimental group 2-1.

Specifically, the content of Rb3 was about 8.21% higher in Experimental group 2-2, about 7.58% higher in Experimental group 2-3, and about 22.98% higher in Experimental group 2-4 than in Experimental group 2-1.

Experiment 3

Experiment 3 was aimed at determining whether treatment with auxiliary light at a higher cumulative dose than in experiment 3 would cause a change in ginsenoside content of sprout ginseng.

Experimental group 3-1 included sprout ginseng samples treated with UVB as auxiliary light 3-1. Here, the sprout ginseng samples were exposed to a cumulative dose of auxiliary light 3-1 of 5.76 kJ/m².

Experimental group 3-1 included sprout ginseng samples treated with UVB as auxiliary light 3-2. Here, the sprout ginseng samples were exposed to a cumulative dose of auxiliary light 3-2 of 11.05 kJ/m².

Figure 7:
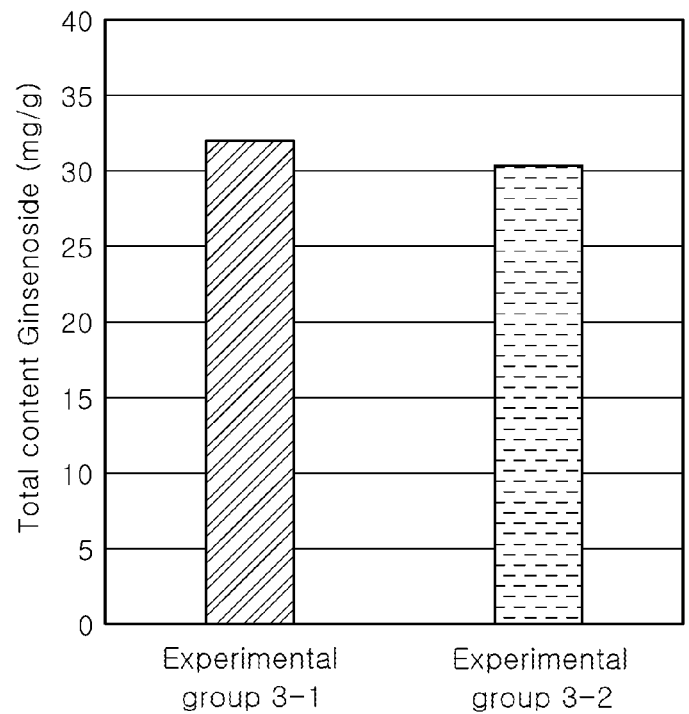
FIG. 7 is a graph showing total ginsenoside content in sprout ginseng according to Experiment 3 of the present disclosure.

FIG. 7 is a graph showing the total ginsenoside content of sprout ginseng according to Experiment 3 of the present disclosure.

Referring to FIG. 7, the total ginsenoside content was lower in Experimental group 3-2 than in Experimental group 3-1.

That is, the treatment with auxiliary light 3-2 at a cumulative dose of 11.05 kJ/m² caused decrease in total ginsenoside content of sprout ginseng.

Referring to Experiments 1 to 3, a cumulative dose of UVB as the auxiliary light suitable for increasing the total ginsenoside content of sprout ginseng is in the range of greater than 0.54 kJ/m² to less than 11.50 kJ/m².

More specifically, treatment with UVB as the auxiliary light at a cumulative dose of 1.08 kJ/m² to less than 5.76 kJ/m² can increase the total ginsenoside content of sprout ginseng.

Figure 8:
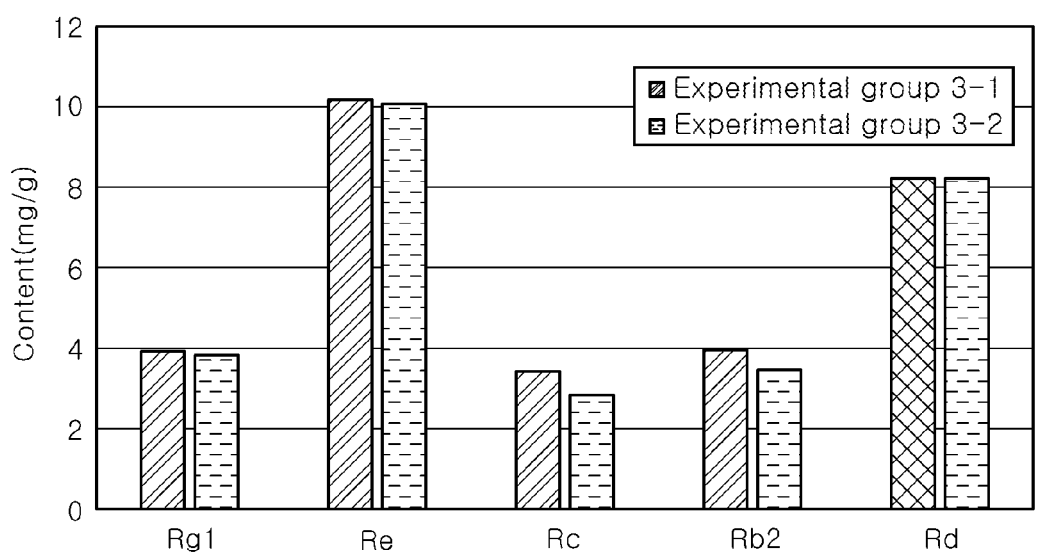
FIG. 8 is a graph showing contents of ginsenoside ingredients Rg1, Re, Rc, Rb2 and Rd in sprout ginseng according to Experiment 3 of the present disclosure.
Figure 9:
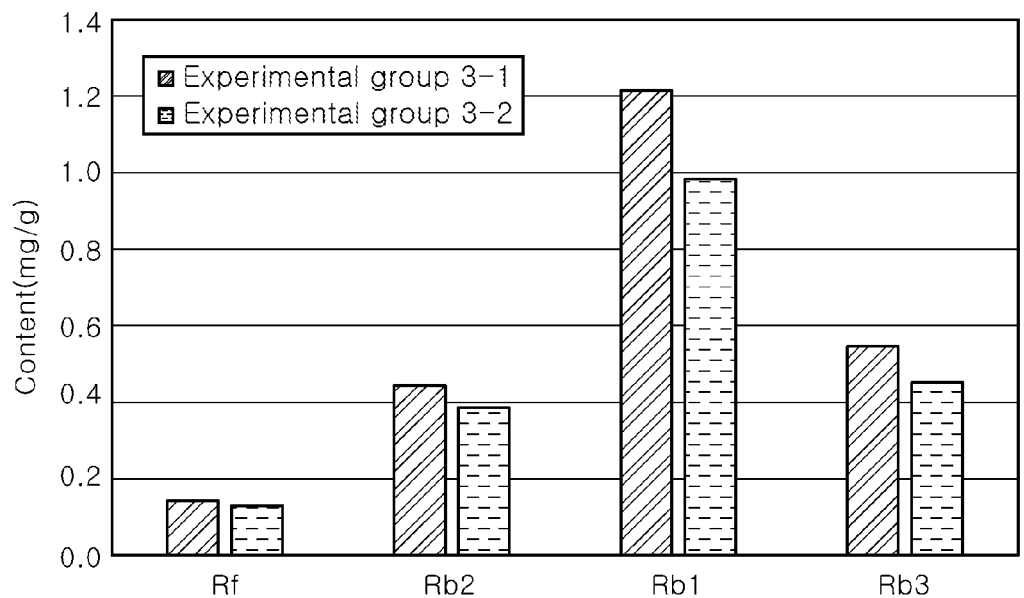
FIG. 9 is a graph showing the contents of ginsenoside ingredients Rf, Rg2, Rb1, and Rb3 in sprout ginseng according to Experiment 3 of the present disclosure.

FIG. 8 and FIG. 9 are graphs showing the content of specific ginsenoside ingredients in sprout ginseng according to Experiment 3 of the present disclosure.

FIG. 8 is a graph showing the contents of ginsenoside ingredients Rg1, Re, Rc, Rb2, and Rd in sprout ginseng according to Experiment 3 of the present disclosure.

FIG. 9 is a graph showing the contents of ginsenoside ingredients Rf, Rg2, Rb1, and Rb3 in sprout ginseng according to Experiment 3 of the present disclosure.

Referring to FIG. 8 and FIG. 9, the contents of Rg1, Re, Rc, Rb2, Rf, Rg2, Rb1, and Rb3 were all lower in Experimental group 3-2 than in Experimental group 3-1.

In addition, there was no significant difference in Rd content between Experimental group 3-1 and Experimental group 3-2 although the content of Rd was about 0.12% higher in Experimental group 3-2 than in Experimental group 3-1.

The results of Experiment 3 showed that, when sprout ginseng was treated with auxiliary light 3-2 delivering a higher cumulative dose than auxiliary light 3-1, the total ginsenoside content and the contents of the ginsenoside ingredients were similar to or lower than when sprout ginseng was treated with auxiliary light 3-1.

Experiments 1 to 3 showed that treatment with UVB as the auxiliary light causes increase in content of only some specific ginsenoside ingredients capable of responding to UVB depending on the cumulative dose thereof, rather than increase in content of all the ginsenoside ingredients.

Referring to FIG. 2, when the cumulative dose of UVB as the auxiliary light was 1.08 kJ/m$^2$ or 2.16 kJ/m$^2$, the contents of Re, Rc, and Rd significantly increased, as compared with Control group.

Referring to FIG. 2, when the cumulative dose of the auxiliary light was 2.16 kJ/m$^2$, the content of Re was most greatly increased.

Here, referring to FIG. 5 and FIG. 8, when the cumulative dose of the auxiliary light was 4.32 kJ/m$^2$, 5.76 kJ/m$^2$, or 11.5 kJ/m$^2$, the content of Re was higher than when the cumulative dose of the auxiliary light was of 2.16 kJ/m$^2$.

Referring to FIG. 5, when the cumulative dose of the auxiliary light was 4.32 kJ/m$^2$, the content of Re was about 63.05% higher than when the cumulative dose of the auxiliary light was 2.16 kJ/m$^2$.

Accordingly, treatment with UVB as the auxiliary light at a cumulative dose exceeding 0.54 kJ/m$^2$ can increase the content of Re. Specifically, a cumulative dose of the auxiliary light for increase in Re content may be in the range of 1.08 kJ/m$^2$ to less than 11.5 kJ/m$^2$. More specifically, a cumulative dose of the auxiliary light for increase in Re content may be in the range of 4.32 kJ/m$^2$ to less than 11.5 kJ/m$^2$.

In particular, treatment with UVB as the auxiliary light at a cumulative dose of 4.32 kJ/m$^2$ can greatly increase the content of Re in sprout ginseng.

Referring to FIG. 2, when the cumulative dose of the auxiliary light was 2.16 kJ/m$^2$, the content of Rc was most greatly increased.

Here, referring to FIG. 5, the content of Rc was higher in Experimental groups treated with the auxiliary light at a cumulative dose of 2.16 kJ/m$^2$ or 5.76 kJ/m$^2$ than in the other Experimental groups.

In addition, referring to FIG. 5, when the cumulative dose of the auxiliary light was 4.32 kJ/m$^2$, the content of Rc was similar to that when the cumulative dose of the auxiliary light was 2.16 kJ/m$^2$.

However, referring to FIG. 8, when the cumulative dose of the auxiliary light was 11.5 kJ/m$^2$, the content of Rc was lower than when the cumulative dose of the auxiliary light was 5.76 kJ/m$^2$.

Accordingly, treatment with UVB as the auxiliary light at a cumulative dose of greater than 0.54 kJ/m$^2$ to less than 11.5 kJ/m$^2$ can increase the content of Rc. More specifically, a cumulative dose of the auxiliary light for increase in Rc content may be in the range of greater than 1.08 kJ/m$^2$ to less than 4.32 kJ/m$^2$ or greater than 4.32 kJ/m$^2$ to less than 11.5 kJ/m$^2$.

In particular, under conditions of a cumulative UVB dose of 2.16 kJ/m$^2$ or 5.76 kJ/m$^2$, sprout ginseng can have more significantly increased Rc content than under the other conditions. Furthermore, considering energy efficiency, sprout ginseng may be treated with UVB as the auxiliary light at a cumulative dose of 2.16 kJ/m$^2$ to increase the content of Rc.

Referring to FIG. 2, the content of Rd was the highest when the cumulative dose of the auxiliary light was 1.08 kJ/m$^2$. That is, when the cumulative dose of the auxiliary light was 1.08 kJ/m$^2$, the content of Rd was higher than when the cumulative dose of the auxiliary light was 2.16 kJ/m$^2$.

Here, referring to FIG. 5, when the cumulative dose of the auxiliary light was 5.75 kJ/m$^2$, the content of Rd was slightly but insignificantly higher than when the cumulative dose of the auxiliary light was 2.16 kJ/m$^2$.

In addition, referring to FIG. 8, when the cumulative dose of the auxiliary light was 11.5 kJ/m$^2$, the content of Rd was similar to that when the cumulative dose of the auxiliary light was 5.75 kJ/m2.

Accordingly, treatment with UBV as the auxiliary light at a cumulative dose exceeding 0.54 kJ/m2 can increase the content of Rd. More specifically, a cumulative dose of the auxiliary light for increase in Rd content may be in the range of 1.08 kJ/m2 to less than 4.32 kJ/m$^2$ or greater than 4.32 kJ/m$^2$ to 11.5 kJ/m$^2$.

In particular, treatment with UBV as the auxiliary light at a cumulative dose of 1.08 kJ/m$^2$ can greatly increase the content of Rd in sprout ginseng.

Referring to FIG. 2, when the cumulative dose of the auxiliary light was 2.16 kJ/m$^2$, the content of Rg1 was similar to that in Control group.

Here, referring to FIG. 5, the content of Rg1 decreased with increasing cumulative dose of the auxiliary light and increased at a cumulative dose of 5.76 kJ/m$^2$. When the cumulative dose of the auxiliary light was 5.76 kJ/m$^2$, the content of Rg1 greatly increased by about 63.05%, as compared with that when the cumulative dose of the auxiliary light was 2.16 kJ/m$^2$.

Further, referring to FIG. 8, when the cumulative dose of the auxiliary light was 11.5 kJ/m$^2$, the content of Rg1 was slightly but insignificantly lower than when the cumulative dose of the auxiliary light was 5.76 kJ/m2.

Therefore, treatment with UVB as the auxiliary light at cumulative dose exceeding 4.32 kJ/m2 can increase the content of Rg1. More specifically, a cumulative dose of the auxiliary light for increase in Rg1 content may be in the range of 5.76 kJ/m2 to less than 11.5 kJ/m2.

In particular, treatment with auxiliary light at cumulative dose of 5.76 kJ/m2 can greatly increase the content of Rg1 in sprout ginseng.

Referring to FIG. 3, when the cumulative dose of the auxiliary light was 1.08 kJ/m2 or 2.16 kJ/m2, the content of Rb1 slightly increased, as compared with that in Control group.

Referring to FIG. 6, the content of Rb1 increased with increasing cumulative dose of the auxiliary light. In particular, when the cumulative dose of the auxiliary light was 4.32 kJ/m2 or 5.76 kJ/m2, the content of Rb1 was significantly increased. In addition, the content of Rb1 was highest when the cumulative dose of the auxiliary light was 5.76 kJ/m2.

However, referring to FIG. 9, when the cumulative dose of the auxiliary light was 11.5 kJ/m2, the content of Rb1 was lower than when the cumulative dose of the auxiliary light was 5.76 kJ/m2.

Therefore, treatment with UVB as the auxiliary light at a cumulative dose of greater than 0.54 kJ/m² to less than 11.5 kJ/m² can increase the content of Rb1. Specifically, a cumulative dose of the auxiliary light for increase in Rb1 content may be in the range of greater than 2.16 kJ/m² to less than 11.5 kJ/m². More specifically, a cumulative dose of the auxiliary light for increase in Rb1 content may be in the range of 4.32 kJ/m² to less than 11.5 kJ/m².

In particular, treatment with UVB as the auxiliary light at a cumulative dose of 5.76 kJ/m² can greatly increase the content of Rb1 in sprout ginseng.

Experiment 4

Experiment 4 was aimed at determining whether treatment with auxiliary light, which is UV light having a different wavelength than UV light used in Experiments 1 to 3, would cause a change in ginsenoside content of sprout ginseng.

The auxiliary light used in Experiments 1 to 3 was UVB, whereas the auxiliary light used in Experiment 4 was UVC.

Experimental group 4-1 included sprout ginseng samples treated with UVC as auxiliary light 4-1. Here, the sprout ginseng samples were exposed to a cumulative dose of auxiliary light 4-1 of 3.24 kJ/m².

Experimental group 4-2 included sprout ginseng samples treated with UVC as auxiliary light 4-2. Here, the sprout ginseng samples were exposed to a cumulative dose of auxiliary light 4-2 of 4.32 kJ/m².

Experimental group 4-3 included sprout ginseng samples treated with UVC as auxiliary light 4-3. Here, the sprout ginseng samples were exposed to a cumulative dose of auxiliary light 4-3 of 5.76 kJ/m².

Experimental group 4-4 included sprout ginseng samples treated with UVC as auxiliary light 4-4. Here, the sprout ginseng samples were exposed to a cumulative dose of auxiliary light 4-4 of 11.5 kJ/m².

Figure 10:
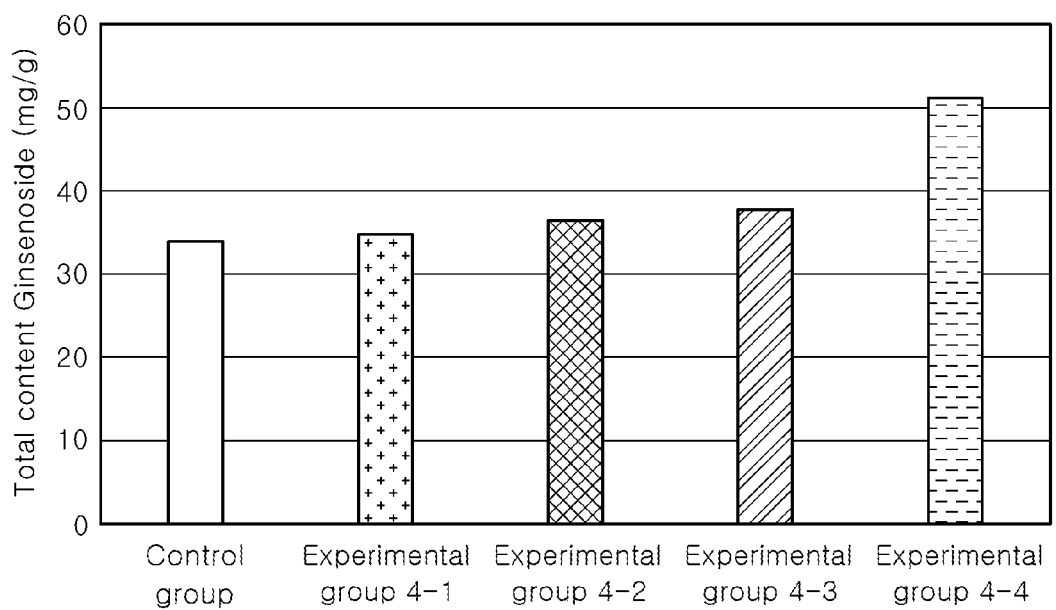
FIG. 10 is a graph showing total ginsenoside content in sprout ginseng according to Experiment 4 of the present disclosure.

FIG. 10 is a graph showing the total ginsenoside content of sprout ginseng according to Experiment 4 of the present disclosure.

Referring to FIG. 10, the total ginsenoside content was slightly but insignificantly higher in Experimental groups 4-1 to 4-3 than in Control group.

However, the total ginsenoside content was significantly higher in Experimental group 4-4 than in Control group. That is, treatment with UVC as the auxiliary light at a cumulative dose of 11.5 kJ/m² can greatly increase the total ginsenoside content of sprout ginseng.

Figure 11:
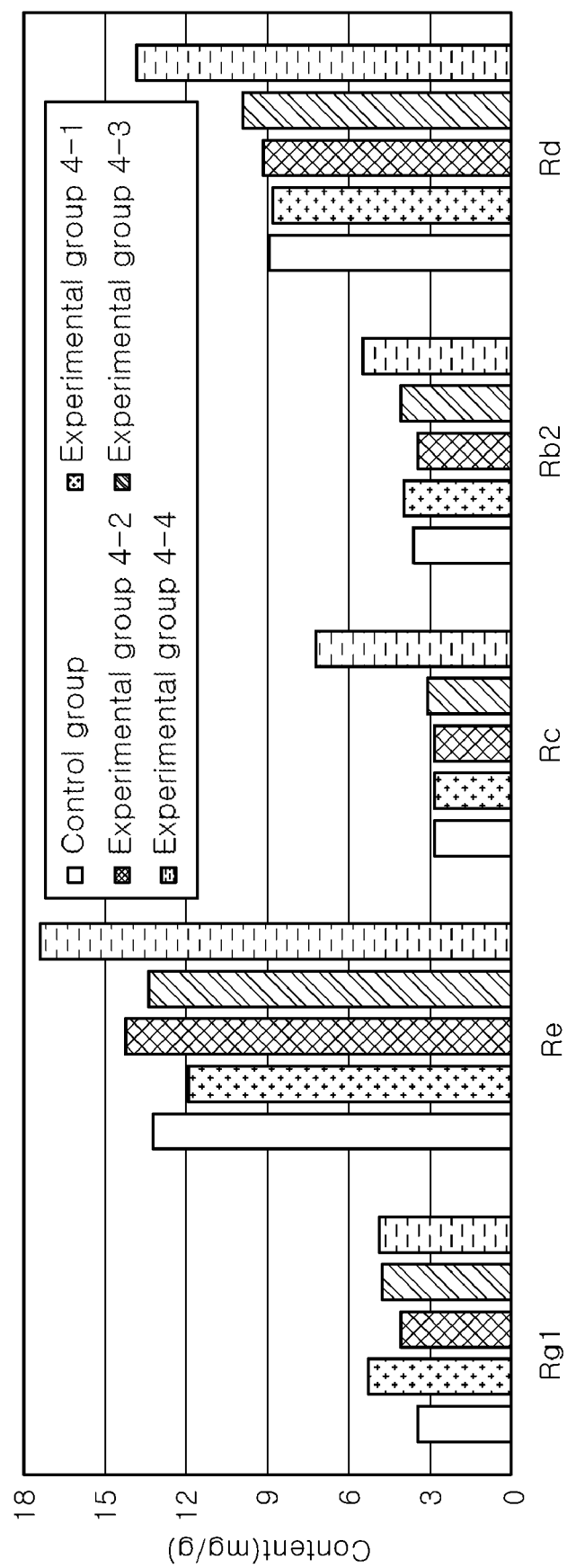
FIG. 11 is a graph showing contents of ginsenoside ingredients Rg1, Re, Rc, Rb2, and Rd in sprout ginseng according to Experiment 4 of the present disclosure.
Figure 12:
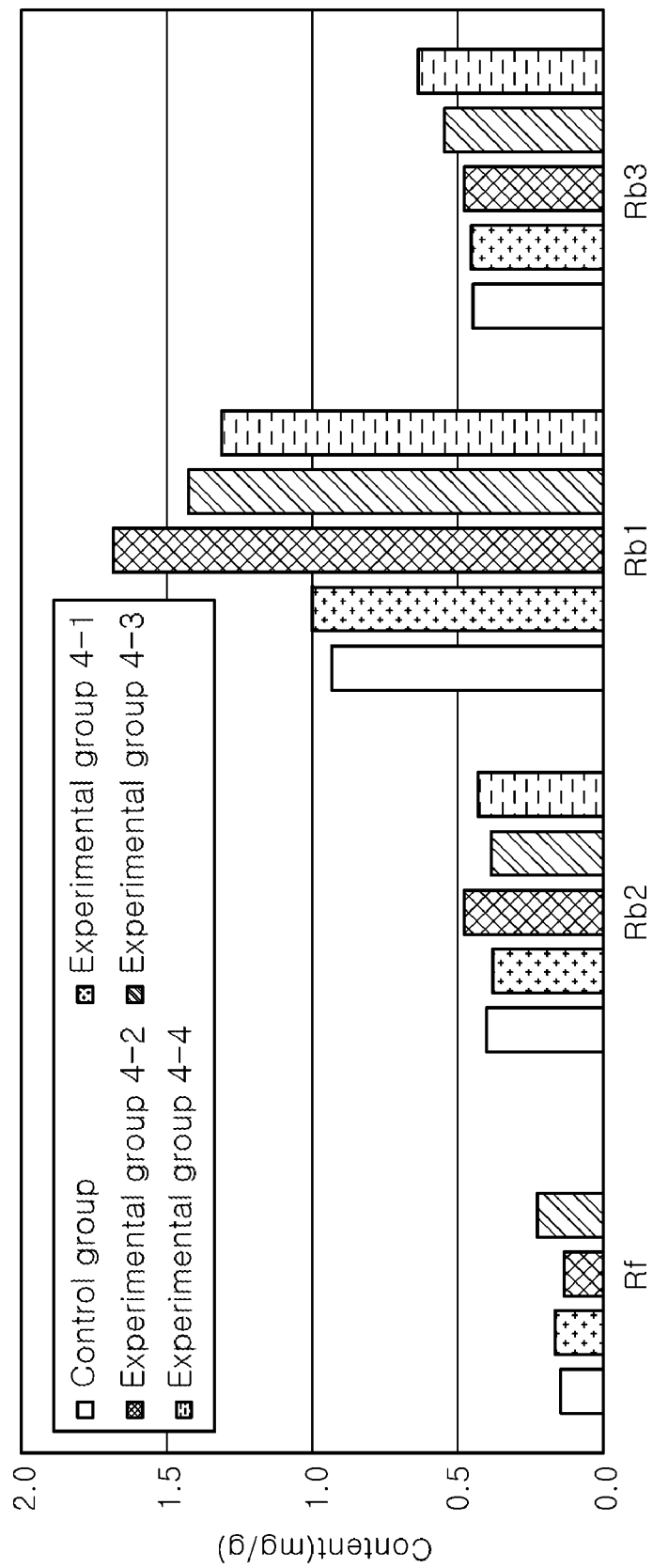
FIG. 12 is a graph showing contents of ginsenoside ingredients Rf, Rg2, Rb1, and Rb3 in sprout ginseng according to Experiment 4 of the present disclosure.

FIG. 11 and FIG. 12 are graphs showing the content of specific ginsenoside ingredients in sprout ginseng according to Experiment 4 of the present disclosure.

FIG. 11 is a graph showing the contents of ginsenosides Rg1, Re, Rc, Rb2, and Rd in sprout ginseng according to Experiment 4 of the present disclosure.

Referring to FIG. 11, the content of Rg1 was higher in all of Experimental groups 4-1 to 4-4 than in the Control group.

In particular, the content of Rg1 was about 53.16% higher in Experimental group 4-1, about 41.20% higher in Experimental group 4-4, and about 37.89% higher in Experimental group 4-3 than in Control group.

The content of Re was lower in Experimental group 4-1 and Experimental group 4-3 than in Control group.

However, the content of Re was higher in Experimental group 4-2 and Experimental group 4-4 than in Control group.

In particular, the content of Re was about 31.64% higher in Experimental group 4-4 than in Control group.

The contents of Rc, Rb2 and Rd were higher in Experimental group 4-4 than in the other Experimental groups by a wide margin.

Specifically, the content of Rc was about 155.79% higher in Experimental group 4-4 than in Control group, the content of Rb2 was about 51.75% higher in Experimental group 4-4 than in the Control group, and the content of Rd was about 54.54% higher in Experimental group 4-4 than in Control group.

The contents of Rc, Rb2, and Rd in Experimental group 4-1 to Experimental group 4-3 were similar to or lower than those in the Control group.

FIG. 12 is a graph showing the contents of ginsenoside ingredients Rf, Rg2, Rb1, and Rb3 in sprout ginseng according to Experiment 4 of the present disclosure.

Referring to FIG. 12, the contents of Rf and Rg2 were slightly higher or lower in all of Experimental groups 4-1 to 4-4 than in Control group.

That is, there was no significant difference in content of Rf and Rg2 between Experimental groups 4-1 to 4-4 and Control group.

The content of Rb1 was higher in all of Experimental groups 4-1 to 4-4 than in Control group.

In particular, the content of Rb1 was significantly higher in Experimental groups 4-2 to 4-4 than in Control group.

The content of Rb1 was about 82.34% higher in Experimental group 4-2, about 54.54% higher in Experimental group 4-3, and about 42.26% higher in Experimental group 4-4 than in Control group.

The content of Rb3 was higher in all of Experimental groups 4-1 to 4-4 than in Control group.

In particular, the content of Rb3 was about 42.48% higher in Experimental group 4-4 than in Control group.

The results of Experiment 4 showed that treatment with UVC as the auxiliary light at a specific cumulative dose can increase the total ginsenoside content of sprout ginseng.

Referring to Experiment 4, a cumulative dose of UVC as the auxiliary light suitable for increasing the total ginsenoside content of sprout ginseng is in the range of greater than 5.76 kJ/m² to 11.5 kJ/m². In particular, a cumulative UVC dose of 11.5 kJ/m² can effectively increase the total ginsenoside content of sprout ginseng.

In addition, Experiment 4 showed that treatment of sprout ginseng with UVC as the auxiliary light can increase the contents of only some specific ginsenoside ingredients capable of responding to UVC depending on the cumulative dose thereof.

Referring to FIG. 11, when the cumulative dose of UVC as the auxiliary light was in the range of greater than 5.76 kJ/m² to 11.5 kJ/m², the contents of Re, Rc, Rb2, and Rd were all significantly increased.

In particular, when the cumulative dose of UVC as the auxiliary light was 11.5 kJ/m², the contents of Re, Rc, Rb2, and Rd were all greatly increased.

Referring to FIG. 12, when the cumulative dose of UVC as the auxiliary light was in the range of greater than 3.24 kJ/m² to 11.5 kJ/m², the content of Rb1 was significantly increased.

However, when the cumulative dose of the auxiliary light exceeded 3.24 kJ/m², the rate of increase in Rb1 content gradually decreased with increasing cumulative dose. In addition, increase in cumulative dose of the auxiliary light can cause damage to appearance of sprout ginseng.

Therefore, treatment with UVC as the auxiliary light at a cumulative dose of greater than 3.24 kJ/m² to less than 5.76 kJ/m² can efficiently increase the content of Rb1.

In particular, treatment with UVC as the auxiliary light at a cumulative dose of 4.32 kJ/m² can greatly increase the content of Rb1.

Referring to FIG. 12, when the cumulative dose of UVC as the auxiliary light was in the range of greater than 5.76 kJ/m² to 11.5 kJ/m², the content of Rb3 was significantly increased.

In particular, when the cumulative dose of UVC as the auxiliary light was 11.5 kJ/m², the content of Rb3 was greatly increased.

Experiments 1 to 4 showed that treatment with UVB at a cumulative dose of greater than 0.54 kJ/m² to less than 11.50 kJ/m² or UVC at a cumulative dose of 11.5 kJ/m² can increase the total ginsenoside content of sprout ginseng.

In addition, treatment with UVB at a cumulative dose of 5.76 kJ/m² to less than 11.5 kJ/m² can increase the content of Rg1 in sprout ginseng. In particular, treatment with UVB at a cumulative dose of 5.76 kJ/m² can effectively increase the content of Rg1 in sprout ginseng.

In addition, treatment with UVB at a cumulative dose of 4.32 kJ/m² to less than 11.50 kJ/m² or UVC at a cumulative dose of greater than 5.76 kJ/m² to 11.5 kJ/m² can increase the content of Re in sprout ginseng. In particular, treatment with UVB at a cumulative dose of 4.32 kJ/m² or UVC at a cumulative dose of 11.5 kJ/m² can effectively increase the content of Re in sprout ginseng.

In addition, treatment with UVB at a cumulative dose of greater than 1.08 kJ/m² to less than 4.32 kJ/m² or greater than 4.32 kJ/m² to less than 11.5 kJ/m2 or UVC at a cumulative dose of greater than 5.76 kJ/m² to 11.5 kJ/m² can increase the content of Rc in sprout ginseng. In particular, treatment with UVB at a cumulative dose of 2.16 kJ/m² or UVC at a cumulative dose of 11.5 kJ/m² can effectively increase the content of Rc in sprout ginseng.

In addition, treatment with UVC at a cumulative dose of greater than 5.76 kJ/m² to 11.5 kJ/m² can increase the content of Rb2 of sprout ginseng. In particular, treatment with UVC at a cumulative dose of 11.5 kJ/m² can effectively increase the content of Rb2 of sprout ginseng.

In addition, treatment with UVB at a cumulative dose of greater than 1.08 kJ/m² to less than 4.32 kJ/m² or greater than 4.32 kJ/m² to less than 11.5 kJ/m² or UVC at a cumulative dose of greater than 5.76 kJ/m² to 11.5 kJ/m² can increase the content of Rd of sprout ginseng. In particular, treatment with UVB at a cumulative dose of 1.08 kJ/m² or UVC at a cumulative dose of 11.5 kJ/m² can effectively increase the content of Rd of sprout ginseng.

In addition, treatment with UVB at a cumulative dose of 4.32 kJ/m² to less than 11.50 kJ/m² or UVC at a cumulative dose of greater than 3.24 kJ/m² to less than 5.76 kJ/m² can increase the content of Rb1. In particular, treatment with UVB at a cumulative dose of 5.76 kJ/m² or UVC at a cumulative dose of 4.32 kJ/m² can effectively increase the content of Rb1.

In addition, treatment with UVC at a cumulative dose of greater than 5.76 kJ/m² to 11.5 kJ/m² can increase the content of Rb3. In particular, treatment with UVC at a cumulative dose of 11.5 kJ/m² can effectively increase the content of Rb3.

The contents of Re, Rc, Rd, and Rb1 can be increased by both treatment with UVB and treatment with UVC, depending on the cumulative dose thereof.

However, the content of Rg1 can be increased only by treatment with UVB, and the contents of Rb2 and Rb3 can be increased only by treatment with UVC.

Figure 13:
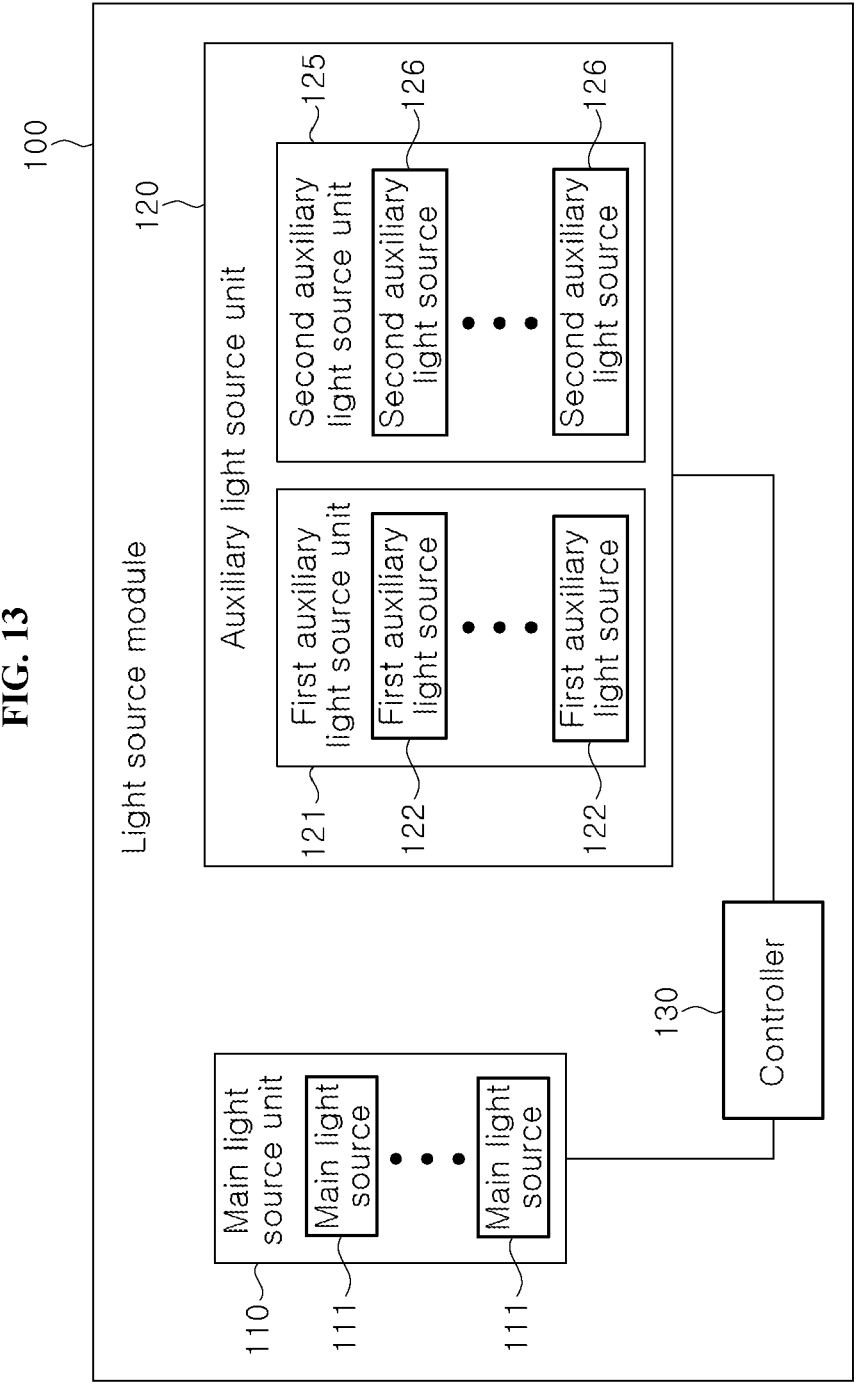
FIG. 13 is a schematic block diagram of a light source module according to a first embodiment of the present disclosure.
Figure 14:
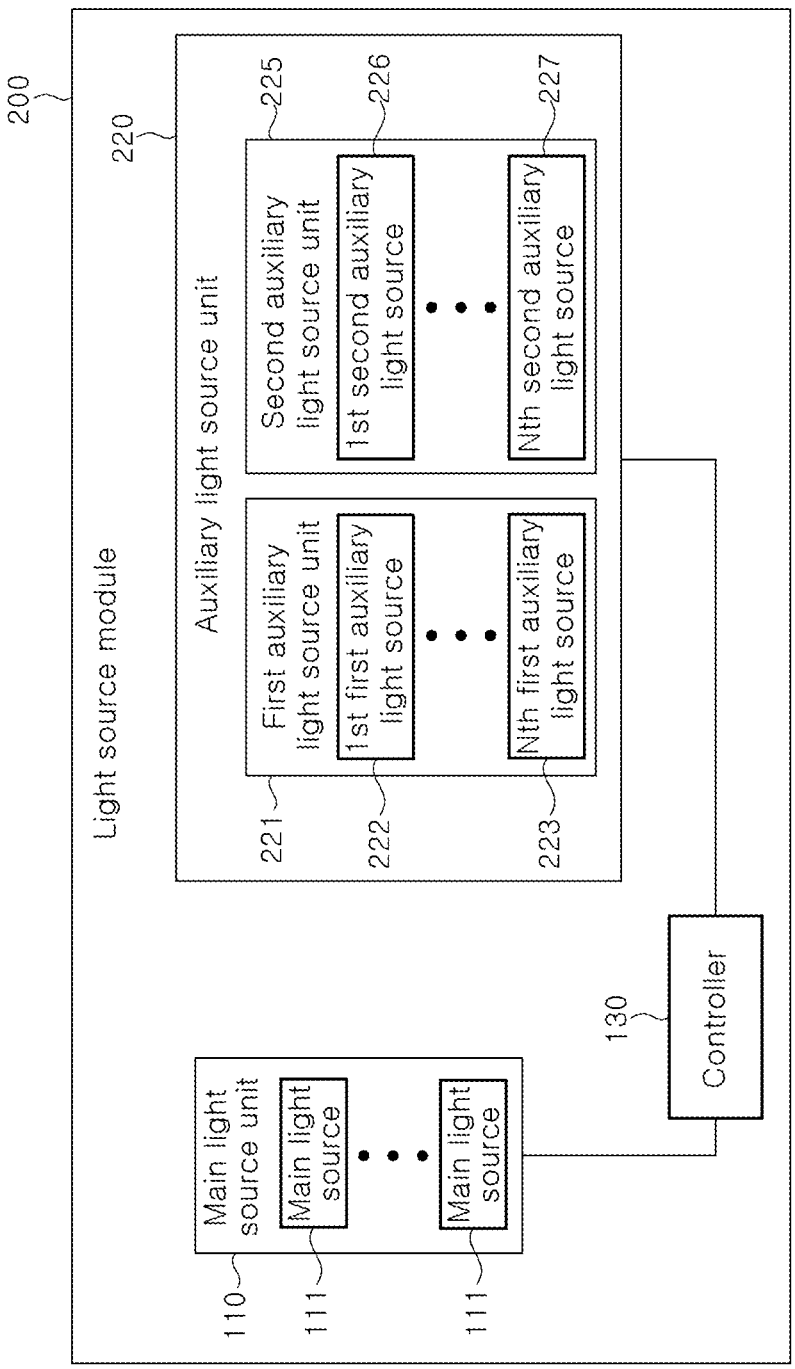
FIG. 14 is a schematic block diagram of a light source module according to a second embodiment of the present disclosure.

FIG. 13 and FIG. 14 are block diagrams of light source modules for plant cultivation according to respective embodiments of the present disclosure.

A light source module according to the present disclosure is used in a place enabling artificial control over plant cultivation environment, such as a plant factory.

Here, the plant factory provides a space in which plants can be cultivated regardless of season by artificially controlling environmental factors related to cultivation of the plants.

The light source module according to the present disclosure can control environmental factors related to growth of a plant and environmental stress related to increase in phytochemical content of the plant.

For example, the light source module according to the present disclosure may supply the plant with auxiliary light, the type and cumulative dose of which have been specified through Experiments 1 to 4.

Thus, the light source module according to the present disclosure can increase the total ginsenoside content or the content of specific ginsenoside ingredients in the plant.

FIG. 13 is a schematic block diagram of a light source module according to a first embodiment of the present disclosure.

Referring to FIG. 13, the light source module 100 according to the first embodiment may include a main light source unit 110, an auxiliary light source unit 120, and a controller 130.

According to this embodiment, the main light source unit 110 supplies plants in a plant cultivation space, such as a plant factory, with background light for growth of plants. That is, the main light source unit 110 is a light source for growth of plants.

For example, the main light source unit 110 may emit visible light in which red light, blue light, and white light are mixed together as the background light.

Alternatively, the main light source unit 110 may emit background light having at least four peak wavelengths over the entire visible spectrum. For example, the background light emitted from the main light source unit 110 may be visible light having peaks in the wavelength ranges of about 430 nm or less, about 440 nm to about 460 nm, about 510 nm to about 530 nm, and about 600 nm to about 630 nm, respectively.

The main light source unit 110 may include at least one main light source 111 emitting the background light. Here, the main light source 111 may include a light emitting diode.

When the main light source unit 110 includes multiple main light sources 111, all the multiple main light sources 111 may emit the same background light.

Alternatively, when the main light source unit 110 includes multiple main light sources 111, at least one of the multiple main light sources 111 may emit light of a different color than the other main light sources. That is, light emitted from the multiple main light sources 111 may be mixed to form the background light. For example, at least one of the multiple main light sources 111 may emit white light, at least another of the multiple main light sources may emit red light, and the other main light sources may emit blue light.

During cultivation of plants, a light period alternates with a dark period. The main light source unit 110 may be operated to supply the background light to plants during the light period.

For example, the light period for which the main light source unit 110 is operated may be set to 16 hours, and the dark period for which the main light source unit 110 stops operation may be set to 8 hours.

According to this embodiment, the auxiliary light source unit 120 may supply plants with auxiliary light capable of increasing the content of specific phytochemicals in the plant.

The auxiliary light emitted from the auxiliary light source unit 120 may be UV light. For example, the auxiliary light may be UVB or UVC.

The auxiliary light source unit 120 may be operated to supply the auxiliary light to plants at predetermined times.

For example, the auxiliary light source unit 120 may be operated to supply the auxiliary light to plants during the light period one day before harvesting.

The auxiliary light source unit 120 may include a first auxiliary light source unit 121 emitting UVB as a first type of auxiliary light and a second auxiliary light source unit 125 emitting UVC as a second type of auxiliary light.

The first auxiliary light source unit 121 may include at least one first auxiliary light source 122 emitting UVB as the first type of auxiliary light.

In addition, the second auxiliary light source unit 125 may include at least one second auxiliary light source 126 emitting UVC as the second type of auxiliary light.

The first auxiliary light source 122 and the second auxiliary light source 126 may include light emitting diodes that emit UV light in respective wavelength ranges.

The controller 130 may control operation of the main light source unit 110 and the auxiliary light source unit 120 based on a predetermined or externally input control signal.

The control signal may contain information about the type and cumulative dose of the auxiliary light. That is, the control signal may contain information about conditions of the auxiliary light.

Alternatively, the control signal may contain information about a target phytochemical among the phytochemicals in one or more plants and information about conditions of the auxiliary light for increase in content of the target phytochemical.

In this way, the controller 130 can control the first auxiliary light source unit 121 or the second auxiliary light source unit 125 to emit the auxiliary light at a cumulative dose corresponding to the control signal.

For example, the control signal may contain information about the type and cumulative dose of the auxiliary light suitable for increasing and/or improving the total content of the phytochemicals or the content of a specific phytochemical.

For example, the controller 130 may include a printed circuit board electrically connected to the light emitting diodes of the main light source unit 110 and the auxiliary light source unit 120.

For example, the controller 130 may control power applied to the main light source 111 based on the control signal such that the main light source unit 110 is operated during the light period and stops operation during the dark period.

In addition, the controller 130 may control power applied to the first auxiliary light source 122 and the second auxiliary light source 126 based on the control signal to control operation of the first auxiliary light source unit 121 and the second auxiliary light source unit 125.

Further, based on the control signal, the controller 130 may control the cumulative doses of the first auxiliary light and the second auxiliary light supplied from the first auxiliary light source unit 121 and the second auxiliary light source unit 125 to plants.

For example, the first auxiliary light source unit 121 may include multiple first auxiliary light sources 122 providing the same irradiance. In addition, the second auxiliary light source unit 125 may include multiple second auxiliary light sources 126 providing the same irradiance.

Here, the controller 130 may control the cumulative doses of the first type of auxiliary light and the second type of auxiliary light by controlling one or more of first auxiliary light sources 122 and one or more of the second auxiliary light sources 126 put into operation based on the control signal.

FIG. 14 is a schematic block diagram of a light source module according to a second embodiment of the present disclosure.

The light source module 200 according to the second embodiment may include a main light source unit 110, an auxiliary light source unit 220, and a controller 130.

The light source module 200 according to the second embodiment differs from the light source module (100 of FIG. 13) according to the first embodiment in terms of the structure of the auxiliary light source unit 220 and operation of the controller 130 related to the auxiliary light source unit 220.

Hereinafter, description will be made mainly on differences between the light source module (100 of FIG. 13) according to the first embodiment and the light source module 200 according to the second embodiment. Thus, for details of the structure of the main light source unit 110 and operation of the controller 130 related to the main light source unit 110, refer to description related to FIG. 13.

The auxiliary light source unit 220 of the light source module 200 according to the second embodiment may include a first auxiliary light source unit 221 emitting UVB as a first type of auxiliary light and a second auxiliary light source unit 225 emitting UVC as a second type of auxiliary light.

The first auxiliary light source unit 221 may include multiple first auxiliary light sources emitting the first type of auxiliary light at different irradiances. For example, the first auxiliary light source unit 221 may include an 1st first auxiliary light source 222 to an nth first auxiliary light source 223.

In addition, the second auxiliary light source unit 225 may include multiple second auxiliary light sources emitting the second type of auxiliary light at different irradiances. For example, the second auxiliary light source unit 225 may include an 1st second auxiliary light source 226 to an nth second auxiliary light source 227.

The controller 230 may control the first auxiliary light source unit 221 to emit the first type of auxiliary light or control the second auxiliary light source unit 225 to emit the second type of auxiliary light based on the control signal.

Here, the controller 230 may operate at least one of the 1st to nth first auxiliary light sources such that one or more plants are treated with the first type of auxiliary light at a cumulative dose corresponding to the control signal.

In addition, the controller 230 may operate at least one of the 1st to nth second auxiliary light sources such that one or more plants are treated with the second type of auxiliary light at a cumulative dose corresponding to the control signal.

Figure 15:
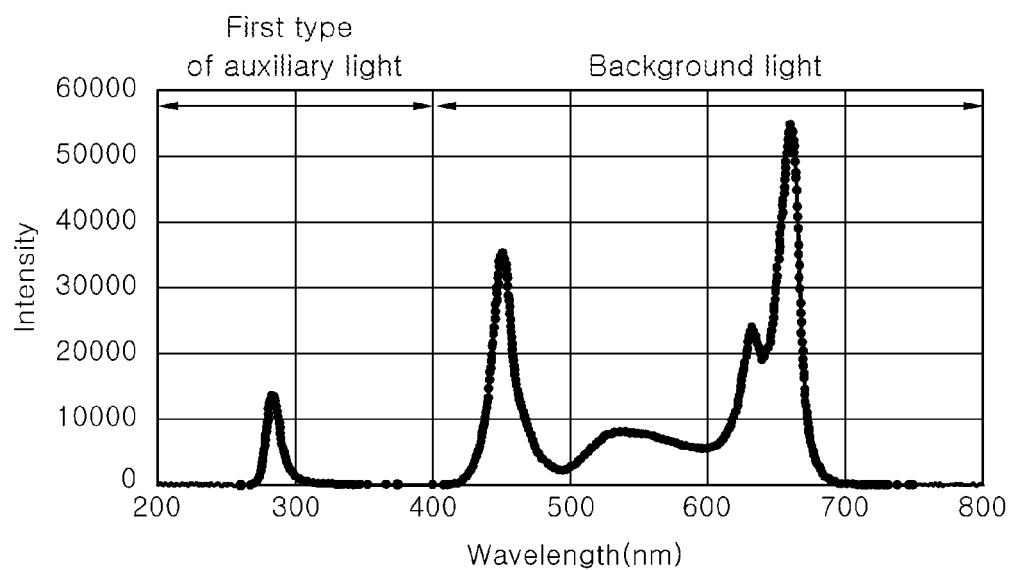
FIG. 15 is a spectrum of a first type of light emitted from a light source module according to the embodiments of the present disclosure.
Figure 16:
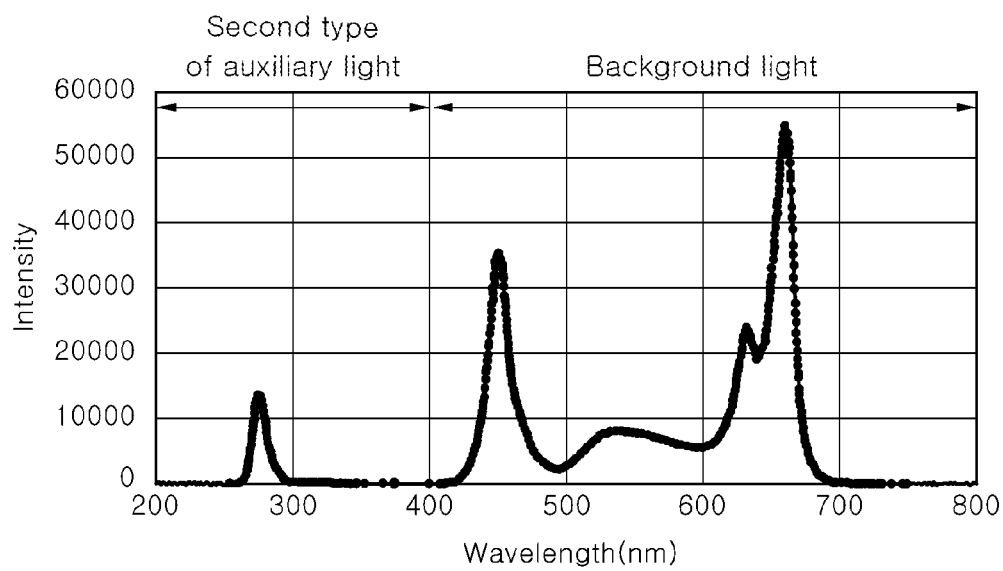
FIG. 16 is a spectrum of a second type of light emitted from the light source module according to the embodiments of the present disclosure.
Figure 17:
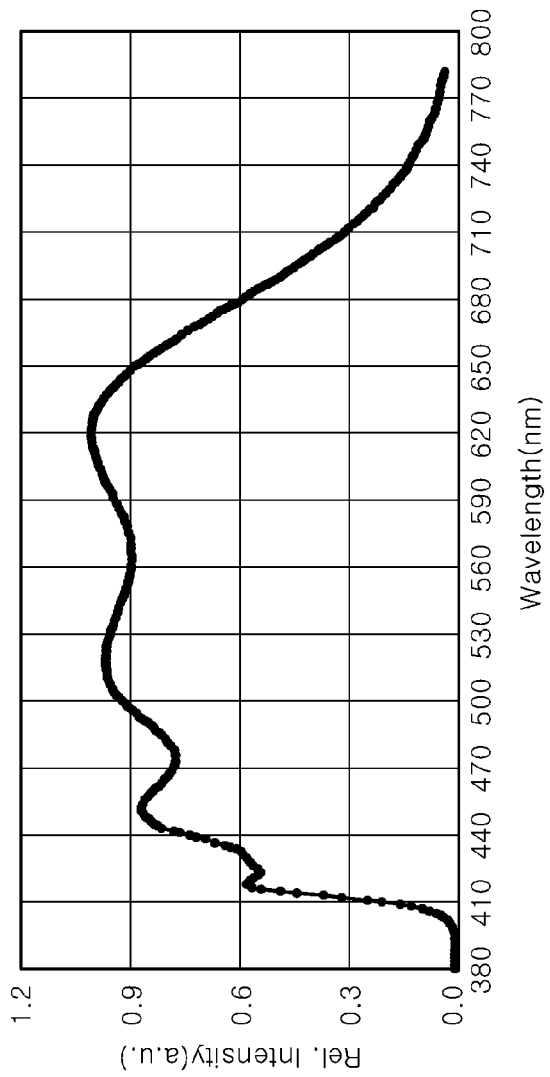
FIG. 17 is another embodiment of a background light emitted from the light source module according to the embodiments of the present disclosure.

FIGS. 15 to 17 are exemplary views showing an optical spectrum of the light source module according to the embodiments of the present disclosure.

FIG. 15 shows a spectrum of a first type of light emitted from the light source module according to the embodiments of the present disclosure.

The first type of light includes the background light emitted from the main light source and the first type of auxiliary light. That is, the first type of light is light supplied to plants during one day before harvesting plants.

The first type of light may be supplied to plants by operating the main light source unit (110 of FIG. 13 and FIG. 14) and the first auxiliary light source unit (121 of FIG. 13 or 221 of FIG. 14) of the light source module (100 of FIG. 13 or 200 of FIG. 14) at the same time.

Referring to FIG. 15, the first type of light is obtained by mixing UVB with visible light in which blue light, red light, and white light are mixed together.

FIG. 16 shows a spectrum of a second type of light emitted from the light source module according to the embodiments of the present disclosure.

The second type of light includes the background light emitted from the main light source and the second type of auxiliary light. That is, the second type of light is light supplied to plants during one day before harvesting the plant.

The second type of light is supplied to plants by operating the main light source unit (110 of FIG. 13 and FIG. 14) and the second auxiliary light source unit (125 of FIG. 13 or 225 of FIG. 14) of the light source module (100 of FIG. 13 or 200 of FIG. 14) at the same time.

Referring to FIG. 16, the second type of light is obtained by mixing UVC with visible light in which blue light, red light, and white light are mixed together.

FIG. 17 shows another embodiment of the background light emitted from the light source module according to the embodiments of the present disclosure.

The background light from the main light source as shown in FIG. 15 and FIG. 16 is visible light in which blue light, red light, and white light are mixed together.

However, the background light shown in FIG. 17 may be used instead of the background light shown in FIG. 15 and FIG. 16.

Referring to FIG. 17, the background light emitted from the main light source may be visible light having peaks in the wavelength ranges of about 430 nm or less, about 440 nm to 460 nm, about 510 nm to 530 nm, and about 600 nm to 630 nm, respectively.

As such, the light source module (100 of FIG. 13 or 200 of FIG. 14) according to the embodiments of the present disclosure may supply the plant with visible light having a similar spectrum to sunlight.

The light source module according to the embodiments of the present disclosure and a plant cultivation method using the same can increase the total ginsenoside content of a plant by supplying the plant with auxiliary light, the type and cumulative dose of which are suited to this purpose.

In addition, the light source module according to the embodiments of the present disclosure and the plant cultivation method using the same can increase the content of specific ginsenoside ingredients in the plant.

The results of Experiments 1 to 3 show that the light source module according to the embodiments of the present disclosure and the plant cultivation method using the same can increase the contents of ginsenoside ingredients Rg1, Re, Rc, Rb2, Rd, Rb1, and Rb3.

Rg1, Re, Rc, Rb2, Rd, Rb1, and Rb3 are known to have the following efficacies:

Rg1 is effective in providing antioxidant capacity, improving memory, and protecting brain cells. Re is effective in providing antioxidant capacity and antidiabetic capacity. Rc is effective in protecting liver function and providing antioxidant capacity. Rb2 is effective in promoting formation of blood vessels, inhibiting cancer cell metastasis, preventing hyperlipidemia, and promoting hepatocyte proliferation. Rd is effective in protecting neurons, providing antioxidant capacity, inhibiting cancer cell metastasis, and providing immune regulation. Rb1 is effective in protecting liver function, protecting neurons, and improving brain function. Rb3 is effective in providing antidiabetic capacity.

Therefore, the light source module according to the embodiments of the present disclosure and the plant cultivation method using the same enable harvest of a plant which is increased in content of necessary ingredients for the intended purpose of use.

Although some embodiments have been described herein, it should be understood that these embodiments are provided for illustration only and are not to be construed in any way as limiting the present disclosure, and that various modifications, changes, alterations, and equivalent embodiments can be made by those skilled in the art without departing from the spirit and scope of the disclosure.

The invention claimed is:

1. A light source for plant cultivation, comprising:
    a first light source configured to emit background light having a blue light and red light; and
    a second light source configured to emit auxiliary light having an ultraviolet light;
    wherein the first light source supplies the background light to the plant during a light period throughout a cultivation period, a supply duration of the background light determining the light period, wherein the second light source supplies the auxiliary light that increases content of a phytochemical in the plant; and
    wherein the plant is a shade plant.

2. The light source for plant cultivation of claim 1, wherein the first light source has an irradiance (photosynthetic photon flux density (PPFD)) of 153 $\mu mol/m^2/s$.

3. The light source for plant cultivation of claim 1, wherein the phytochemical comprises ginsenoside.

4. The light source for plant cultivation of claim 1, wherein the phytochemical comprises one selected from ginsenoside ingredients comprising Rg1, Re, Rc, Rb2, Rd, Rb1, Rb3, or a combination thereof.

5. The light source for plant cultivation of claim 1, wherein the second light source further comprises:
    at least one first auxiliary light source operable to emit UVB with a first cumulative dose of the UVB as a first type of auxiliary light; and
    at least one second auxiliary light source operable to emit UVC with a second cumulative dose of the UVC as a second type of auxiliary light.

6. The light source for plant cultivation of claim 5, wherein two or more first auxiliary light sources provide the same level of first irradiance.

7. The light source for plant cultivation of claim 6, wherein:
    two or more second auxiliary light sources provide the same level of second irradiance.

8. The light source for plant cultivation of claim 1, wherein the second light source, as an auxiliary light source, is operable to supply the auxiliary light to the plant during the light period and one day before harvesting the plant.

9. A light source for plant cultivation, comprising:
    a first light source configured to emit background light having a blue light and a red light; and
    a second light source configured to auxiliary light having an ultraviolet light;
    wherein the first light source supplies the background light to the plant during a light period throughout a cultivation period, a supply duration of the background light determining the light period, wherein the second light source supplies the auxiliary light that increases content of a phytochemical in the plant; and wherein the second light source, as an auxiliary light source, supplies the auxiliary light to the plant during the light period.

10. The light source for plant cultivation of claim 9, wherein the first light source has an irradiance (photosynthetic photon flux density (PPFD)) of 153 μmol/m²/s.

11. The light source for plant cultivation of claim 9, wherein the phytochemical further comprises ginsenoside.

12. The light source for plant cultivation of claim 9, wherein the phytochemical comprises one selected from ginsenoside ingredients comprising Rg1, Re, Rc, Rb2, Rd, Rb1, Rb3, or a combination thereof.

13. The light source for plant cultivation of claim 9, wherein the second light source comprises:

at least one first auxiliary light source emitting UVB, with a first cumulative dose of the UVB, as a first type of auxiliary light; and at least one second auxiliary light source emitting UVC, with a second cumulative dose of the UVC, as a second type of auxiliary light.

14. The light source for plant cultivation of claim 13, wherein the at least one first auxiliary light source further comprises a plurality of first auxiliary light sources providing different levels of first irradiance.

15. The light source for plant cultivation of claim 14, wherein:

the at least one second auxiliary light source unit further comprises a plurality of second auxiliary light sources providing different levels of second irradiance.

16. The light source for plant cultivation of claim 9, wherein the second light source supplies the auxiliary light one day before harvesting the plant.

17. A light source for plant cultivation, comprising:

a first light source configured to emit background light having a blue light and a red light; and a second light source configured to auxiliary light having an ultraviolet light;

wherein the first light source supplies the background light to the plant during a light period throughout a cultivation period, a supply duration of the background light determining the light period, wherein the second light source supplies the auxiliary light that increases content of a phytochemical in the plant; and wherein the phytochemical comprises ginsenoside.

18. The light source for plant cultivation of claim 17, wherein the first light source has an irradiance (photosynthetic photon flux density (PPFD)) of 153 μmol/m²/s.

19. The light source for plant cultivation of claim 17, wherein the second light source supplies the auxiliary light one day before harvesting the plant.

* * * * *